United States Patent
Morikawa et al.

[11] Patent Number: 6,119,624
[45] Date of Patent: Sep. 19, 2000

[54] APPARATUS FOR SPRINKLING FOOD PRODUCTS WITH POWDER MATERIAL

[75] Inventors: Michio Morikawa; Koichi Hirabayashi; Hiroyuki Usui, all of Tochigi-ken, Japan

[73] Assignee: Rheon Automatic Machinery Co., Japan

[21] Appl. No.: 08/878,289

[22] Filed: Jun. 18, 1997

[30] Foreign Application Priority Data

Jun. 19, 1996 [JP] Japan .................................. 8-180127

[51] Int. Cl.[7] .............................. A21C 9/04; B05C 1/08; B05B 7/14; B07B 1/00
[52] U.S. Cl. ............................. 118/13; 118/24; 118/259; 118/308; 118/612; 209/245; 209/254; 209/387; 222/236; 222/244
[58] Field of Search .................................. 118/13, 15, 18, 118/24, 25, 248, 249, 259, 308, 309, 324, 612, DIG. 4; 222/289, 236, 232, 233, 234, 243, 244; D7/667; 209/244, 245, 246, 254, 379, 387

[56] References Cited

U.S. PATENT DOCUMENTS

| | | | |
|---|---|---|---|
| 3,149,760 | 9/1964 | Eichorn et al. | 222/238 |
| 3,817,206 | 6/1974 | Case | 118/7 |
| 3,827,394 | 8/1974 | Takahashi et al. | 118/2 |
| 4,691,846 | 9/1987 | Cordell et al. | 222/198 |

OTHER PUBLICATIONS

Thompson, F.M., "Feeders: smoothing the flow of materials through the plant", Solids Handling, Kenneth McNaughton ed., McGraw–Hill, pp. 113–123, 1981.

*Gazette of Collected and Widely and Commonly Used Techniques*, Japanese Patent Office, Feb. 20, 1980, pp. 67 & 68.

*Primary Examiner*—Richard Crispino
*Assistant Examiner*—J. A. Lorengo
*Attorney, Agent, or Firm*—Brinks Hofer Gilson & Lione

[57] ABSTRACT

A sprinkling apparatus for sprinkling powder material onto food products. The apparatus includes a hopper for holding the powder material that is mounted above a conveyor. A drum is rotatably mounted within the hopper and stirs the powder material. The drum has a rotation surface provided with recesses thereon for receiving the powder material. A narrow passageway is provided between the rotation surface of the drum and an inner wall of the hopper. The narrow passageway presses the powder material against the rotation surface of the drum. A wiper is attached to an exit opening of the hopper and wipes the compressed powder material from the rotation surface of the drum. The wiped powder material leaves the exit opening of the hopper and is sprinkled on the food products.

7 Claims, 6 Drawing Sheets

APPARATUS FOR SPRINKLING FOOD PRODUCTS WITH POWDER MATERIAL

FIELD OF THE INVENTION

This invention relates to a method and apparatus for sprinkling powder material, such as flour, onto food products in a food production system.

BACKGROUND OF THE INVENTION

Conventionally, a sprinkling apparatus is used in bread-production systems in which bread dough is moved by a conveyor. The sprinkling apparatus is typically located above the conveyor, and includes a hopper for holding powder material such as flour, and a sprinkler for sprinkling the flour from the hopper onto the conveyed bread dough. For the best performance of the sprinkling apparatus, the sprinkler must stir the flour in the hopper so that the distribution of the sprinkled flour across or around the bread dough is reasonably uniform.

Various sprinkler apparatuses have been employed in bread-production systems. Two exemplary sprinkler apparatuses are disclosed on pages 67 and 68 of the *Gazette of Collected and Widely and Commonly Used Techniques*, which was published by the Japanese Patent Office on Feb. 20, 1980. The first sprinkler apparatus disclosed in the *Gazette* includes two parallel and connected rotating rollers mounted on a bottom opening of a hopper. One of the two rollers is a feeder roller in which slots are knurled on its rotating (peripheral) surface, and the other roller is a rotating brush. When the two rollers rotate, the feeder stirs the powder material in the hopper. The flour tends to stick to the rotating surface of the feeder, and is then brushed by the rotating brush. In the second sprinkler apparatus disclosed in the *Gazette*, a bottom portion of the hopper is formed from a net which is rubbed by a brush or plate mounted within the hopper so as to be reciprocally rotatable. When the meshed bottom portion of the hopper and the brush or plate are rubbed together, the powder material falls out of the hopper.

In the first sprinkler apparatus mentioned in the *Gazette*, sometimes the powder material is fine-grained, and tends to set, such as weak flour, and bridging of the flour can occur within the hopper so that the flour jams within it. The jammed flour causes the supply of flour to be insufficient and flour tends to be poorly sprinkled on the bread dough. Additionally, the sticking force for causing the flour to stick to the knurled slots of the feeder may be insufficient so that the flour falls off before reaching the rotating brush. Thus, there is a limit to the kinds of powder material that can be used for this type of sprinkler. Further, every brush stroke by the rotating brush stirs up the powder material, and causes the working environment to be contaminated.

A problem that arises with the second sprinkler apparatus of the Gazette is that the amount of powder material to be sprinkled changes rapidly before and after every passage of the brush or plate, thereby producing non-uniform sprinkling by the sprinkler apparatus. Thus, the powder material is distributed on the food product in a wave-like disproportionate pattern, and does not provide a suitably uniform distribution.

SUMMARY OF THE INVENTION

Accordingly, one object of the present invention is to provide a sprinkling method and apparatus that is readily adaptable for sprinkling food products with powder material regardless of the characteristics of the powder material, such as a difference between strong flour powder and weak flour powder.

Another object of the present invention is to provide a sprinkling method and apparatus that prevents bridging of the powder material from occurring within a hopper. This invention results in a continuous and uniform distribution of the powder material on the food products.

It is still another object of the present invention to provide a sprinkling method and apparatus that prevents the powder material in the area surrounding the sprinkling apparatus from being stirred up.

The present invention provides an apparatus for sprinkling food products with powder material. In one embodiment, the apparatus includes means for conveying food products, the conveying means having a surface on which the food products are laid, and hopper means, located above the conveying means, for holding powder material in a space defined by inner walls of the hopper means. The hopper means has an exit opening provided on a bottom thereof. The apparatus further comprises a rotating member having a rotation surface rotatably mounted within the hopper means. The rotation surface provides recesses thereon for receiving the powder material. The apparatus further comprises pressing means provided in the hopper means. The pressing means presses the powder material within the hopper means against the rotation surface of the rotating member. The apparatus further comprises wiping means for wiping the compressed powder material from the rotation surface of the rotating member at the exit opening of the hopper means, and for causing the wiped powder material to be discharged through the exit opening. The wiping means may be composed of a wire mesh or woven material. However, any other device suitable for wiping powder material can be used.

According to embodiments of this invention, the pressing means includes a narrow passageway provided between the rotation surface of the rotating member and the inner wall of the hopper means. According to one embodiment of the invention, the apparatus further comprises a movable plate slidably supported on the inner wall of the hopper means above the narrow passageway, wherein the movable plate breaks up bridges of powder material formed on the inner walls of the hopper means, stirs the powder material within the hopper means and feeds the powder material into the narrow passageway by its sliding movement.

The movable plate may have a plurality of holes on the surface in contact with the inner wall of the hopper means so as to facilitate scraping of powder material from the wall. The lower end portion of the movable plate may have a flat surface without any hole. The lower end and the portion of the movable plate nearby push or guide powder material toward the pressing means, where the narrow passageway is formed.

In one aspect of the present invention, a method for sprinkling food products with powder material is provided in which powder material is supplied into a hopper provided with an exit opening on a bottom thereof. Secondly, the powder material is introduced into recesses provided on a rotation surface of a rotating member. The powder material is then pressed within the hopper means against the rotation surface of the rotating member. The compressed powder material is wiped from the rotation surface of the rotating member at the exit opening of the hopper means, thereby causing the wiped powder material to exit through the exit opening.

The movable plate may have a rough surface or an area with a plurality of holes for stirring or scraping the powder material. The movable plate may also be composed of a material having a high coefficient of friction to facilitate the scraping function.

These and other objects of the invention will be further described in the following detailed description, with reference to the accompanying drawings.

DETAILED DESCRIPTION OF PREFERRED EMBODIMENT

Figure 1:
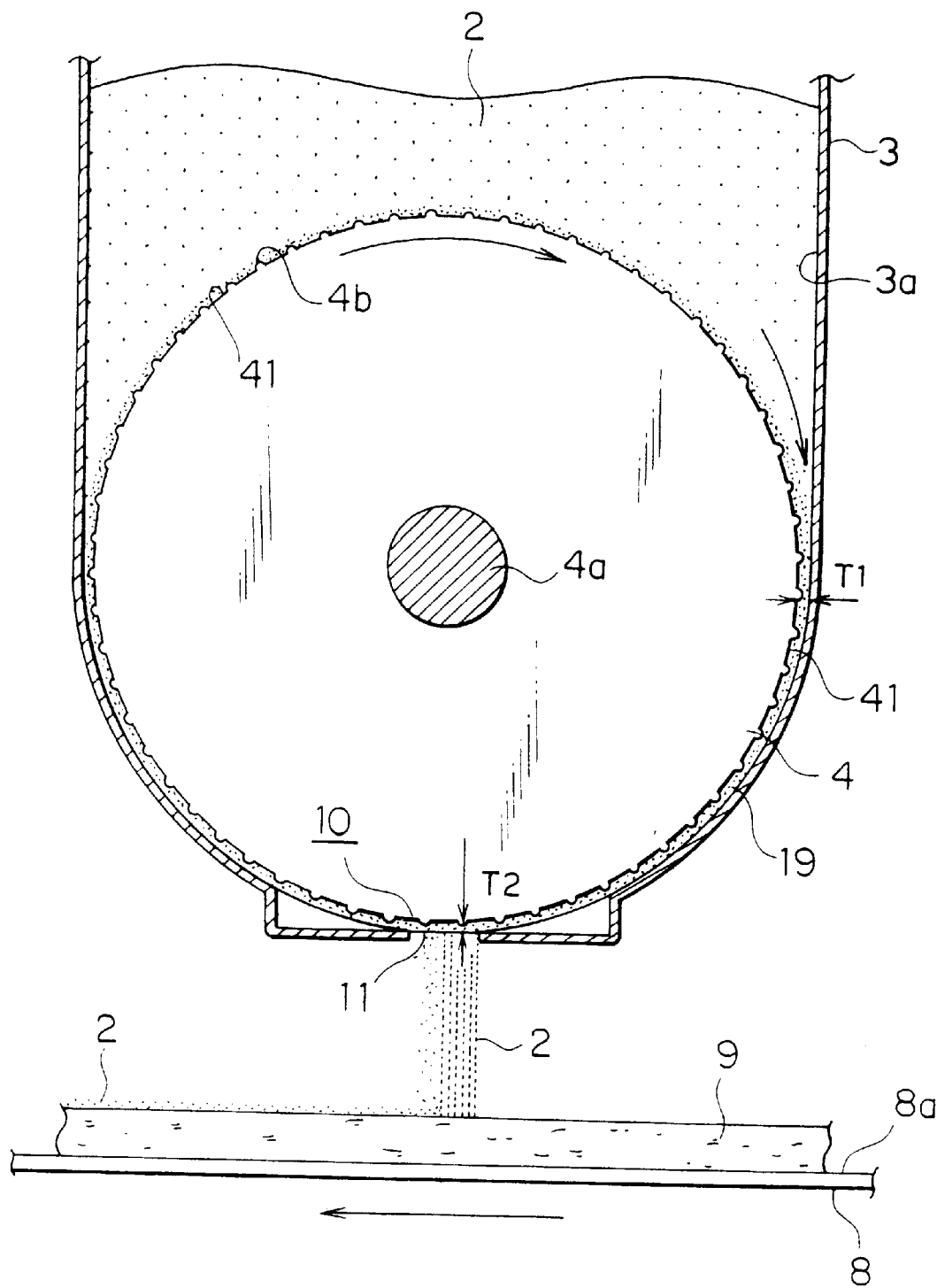
FIG. 1 is a longitudinal sectional view of a sprinkling apparatus according to the first embodiment of the invention, showing a drum in a hopper.
Figure 2:
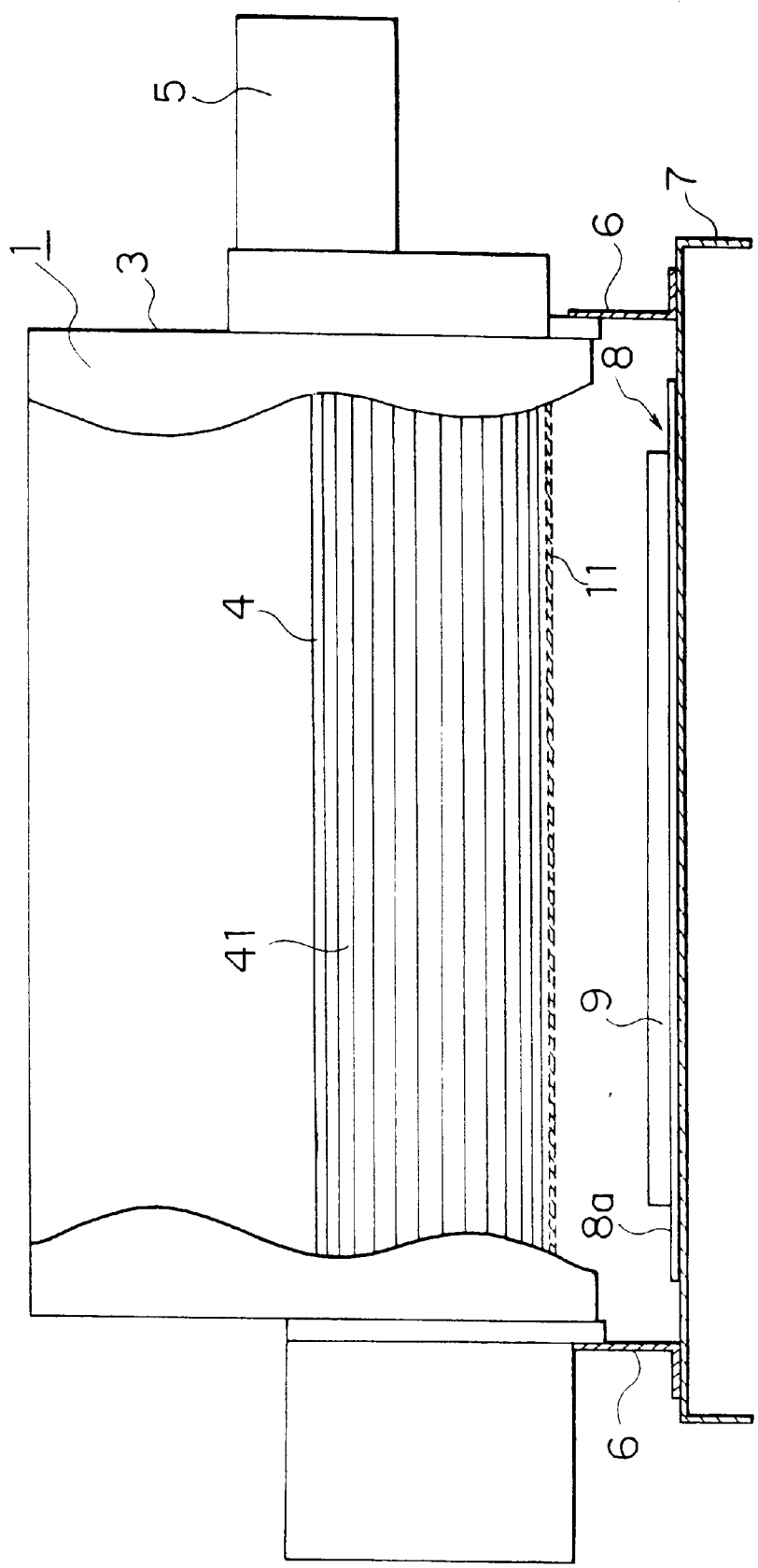
FIG. 2 is a side elevation view, partly broken away to show the interior construction of the apparatus of FIG. 1.

A sprinkling apparatus in accordance with a first embodiment of the present invention is disclosed in FIGS. 1 and 2. Referring to these figures, a conveyor 8 is supported on a frame 7. A bread dough sheet 9 rests on the surface 8a of a conveyor 8 which moves in the direction represented by the arrow shown in FIG. 1. The dough sheet 9 passes under a sprinkling apparatus 1 mounted on brackets 6 that are attached to the conveyor frame 7. The sprinkling apparatus 1 includes a hopper 3 holding flour 2 and an elongated rotating drum 4 located at the bottom of the hopper 3. The bottom of the hopper 3 accommodates the drum 4 and thus extends in the axial direction of the drum 4. The bottom of the hopper 3 is formed with a discharge opening 10 for discharging the flour 2.

Attached to the bottom end of the hopper is a wiper 11 which covers a portion of the opening 10. The wiper 11 is shaped so that it forms an exit for the flour 2 in the hopper 3 as it wipes the flour 2 from the rotating drum 4. The wiper 11 can be fabricated from a wire mesh, or a loosely woven material, or other suitable material. The configuration of the wiper 11 is not limited to a planar or curved shape, but it should be in a form which can wipe the flour 2 attached to the rotating drum 4 so that the flour drops onto food material located on the conveyor.

As shown in FIG. 2, the drum 4 is in the shape of an elongated cylinder such that it extends over the conveyor 8, and is driven to rotate around a center shaft 4a by a motor 5 which is connected to the shaft 4a. In an embodiment of FIG. 1, the drum 4 rotates in a clockwise direction. The drum 4 acts as a feeder for feeding the flour 2 from within the hopper 3 to the opening 10, while simultaneously acting as a stirrer for stirring the flour 2 located in the hopper 3. A bottom portion of an inner wall 3a of the hopper 3 has curves adapted to the rotation surface 4b of the drum 4, thereby forming a narrow passageway 19 between the inner wall 3a and the rotation surface 4b to the discharge opening 10. The narrow passageway 19 has a width which varies to press the powder material against the rotation surface 4b of the drum 4. Let $T_1$ denote a distance between the hopper inner wall 3a and the drum rotation surface 4b at an entrance of the passageway 19. Let $T_2$ be a distance between the surface 4b and the upper surface of the wiper 11 at the opening 10. The relationship of $T_1$ and $T_2$ is $T_1 > T_2$.

The width of the passageway 19 before the opening 10 can be gradually decreased from $T_1$ to $T_2$, or the passageway 19 can keep a constant width $T_1$ until it reaches the opening 10.

The drum 4 has slots 41 extending in the longitudinal direction of the shaft 4a which are formed on the rotation surface 4b. Each slot 41 has an arc-like cross section.

In this arrangement, the flour 2 in the hopper 3 enters the slots 41 of the drum 4, and is carried into the narrow passageway 19 by the rotation of the drum 4, and then is pressed against the rotation surface 4b of the drum 4. When the flour 2 is brought by the rotation of the drum 4 to the position where the wiper 11 is provided, the flour is then subjected to the wiper action while the drum 4 rotates. The flour 2 is scraped by the uneven surfaces of the wiper 11, which is a net in this embodiment, as shown in FIG. 2. The wiped portion thereof falls from the discharge opening 10 through gaps of the wiper 11, while the remaining portion thereof returns into the hopper 3 by the continuous rotation of the drum 4. Such wiped flour is sprinkled on the dough sheet 9 or the conveyor surface 8a or both, and is thereby deposited on the dough. In this case, the flour does not drift about in the surrounding environment, and is uniformly distributed on the dough.

The flour 2 in the hopper 3 is stirred by rotating the drum 4 so that it does not form a bridge, and it cannot jam in the hopper 3. In this embodiment, the narrow passageway 19 acts as a means for pressing the powder material against the rotation surface 4b of the drum 4. It is understood that the pressing means is not limited to the narrow passageway 19, but can be replaced by any other suitable arrangement. For example, the pressing means can also be provided by any other type of compressor that can press the powder material against the rotation surface 4b of the drum 4.

The sprinkling of the flour from the opening 10 can be controlled by adjusting the distance $T_2$, or by adjusting the rotation speed of the drum 4.

Figure 3:
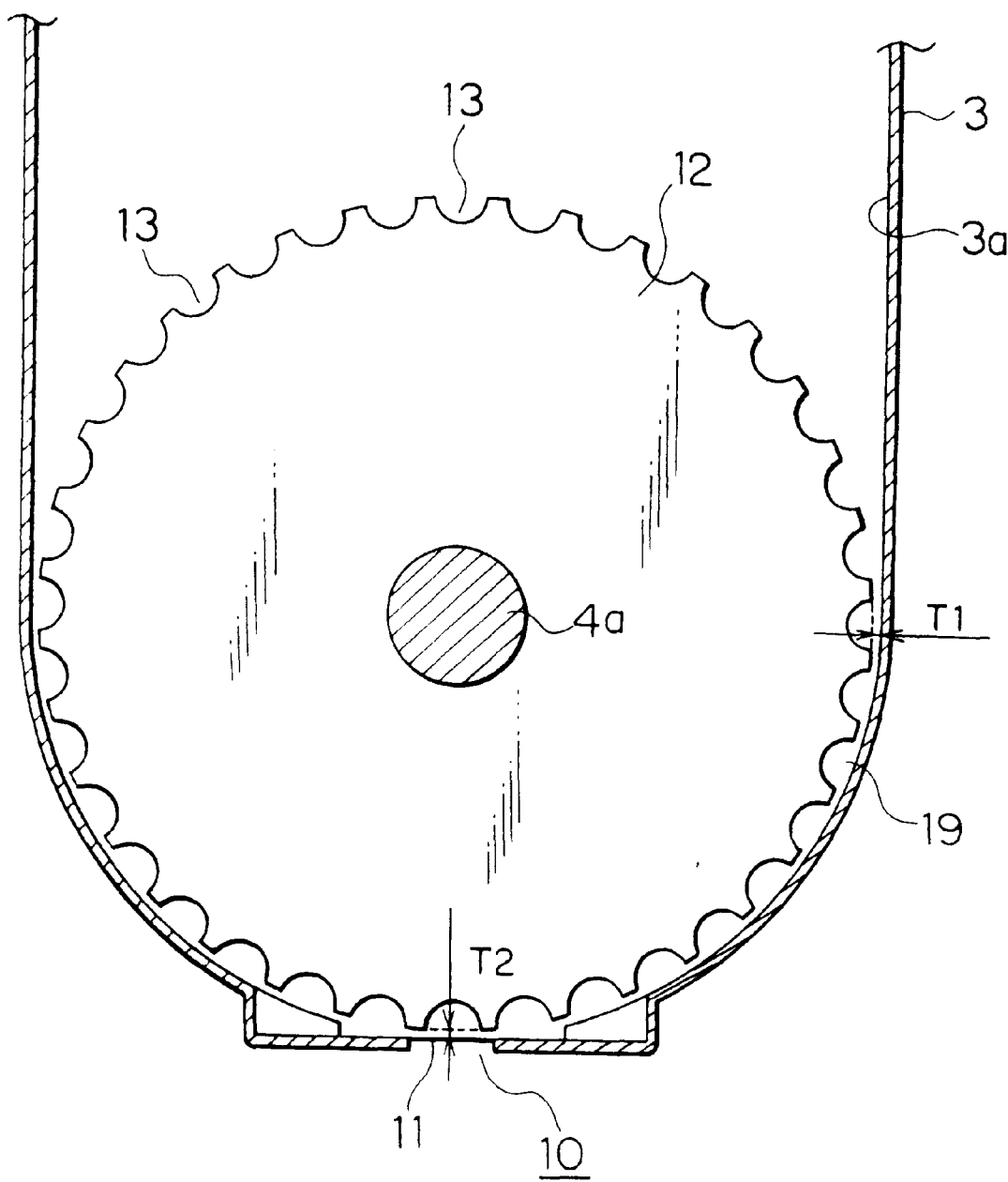
FIGS. 3 and 4 are longitudinal sectional views of modified forms of the drum shown in FIG. 1.
Figure 4:
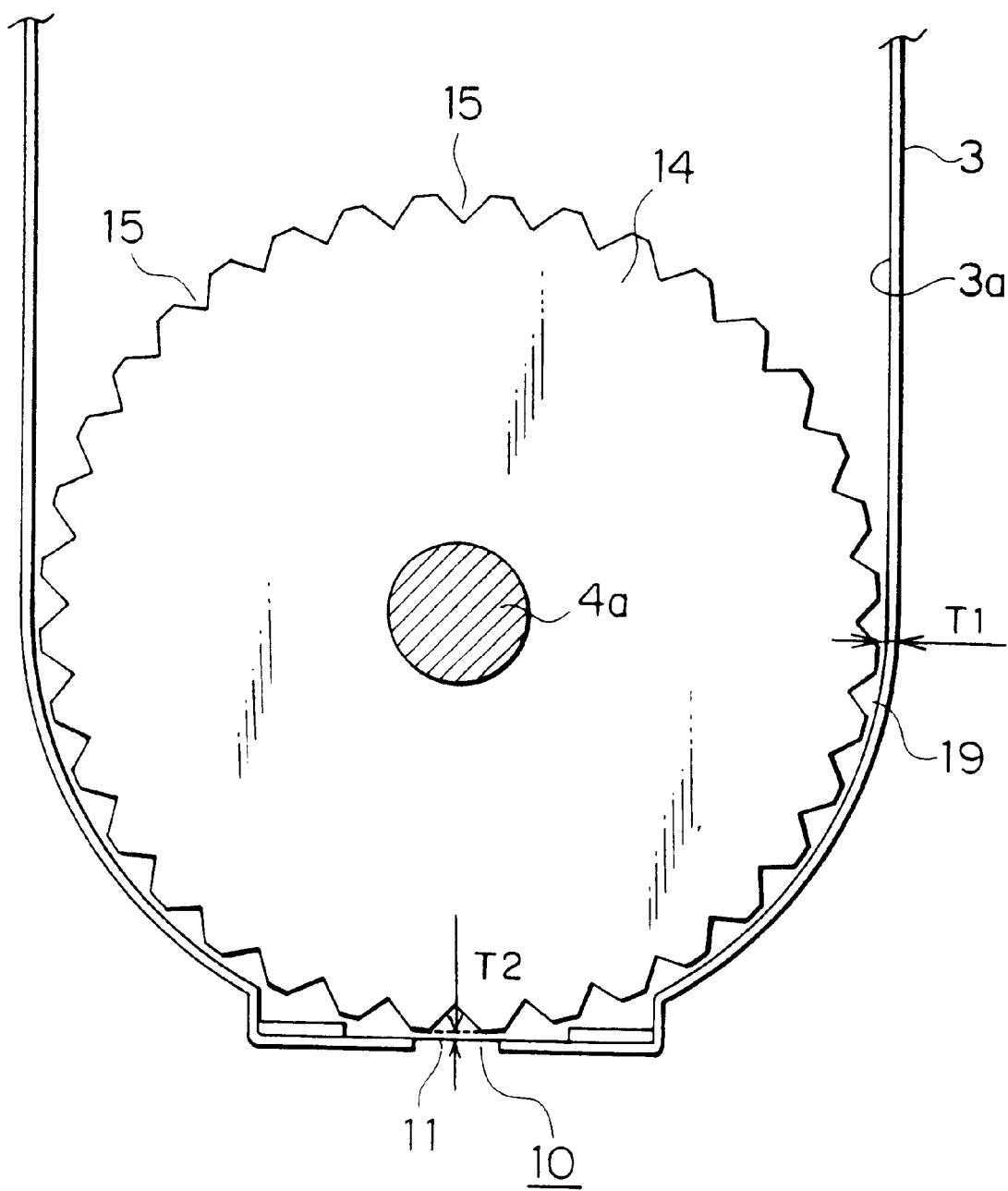

FIGS. 3 and 4 show alternative drums, which can be used in place of the drum 4 of FIGS. 1 and 2. The difference between the drum 12 of FIG. 3 and the drum 4 of FIGS. 1 and 2 is that the drum 12 includes slots 13, each of which has a semicircular cross section, instead of the arcuate slots 41 of FIG. 1. Similarly, each slot 15 of the drum 14 of FIG. 4 has a substantially "V" shaped cross section, instead of the arcuate slots 41 of FIG. 1. It is recognized that the slots may have various additional shapes adapted for holding the powder material, and are not limited to the arcuate, semicircular, or "V" shaped forms shown in the figures.

In general, bridging of the powder material in the hopper 3 is dependent upon the characteristics and states of the powder material to be sprinkled. For example, if the powder material contains moisture or oil due to its having been recycled, it is more likely that bridging will occur than with the use of pure powder material.

Figure 5:
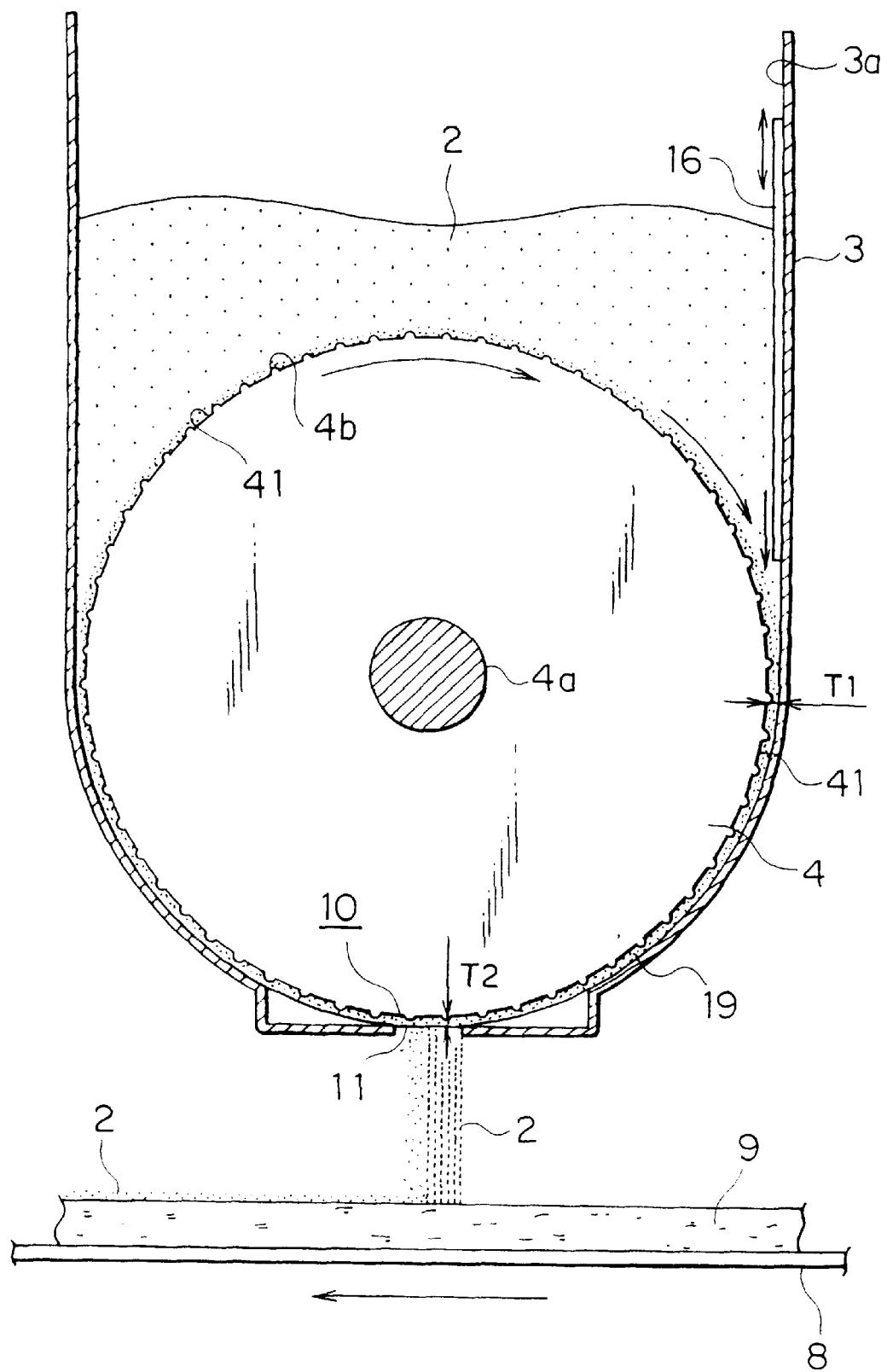
FIG. 5 is a view similar to FIG. 1, showing a sprinkling apparatus according to a second embodiment of the invention.
Figure 6:
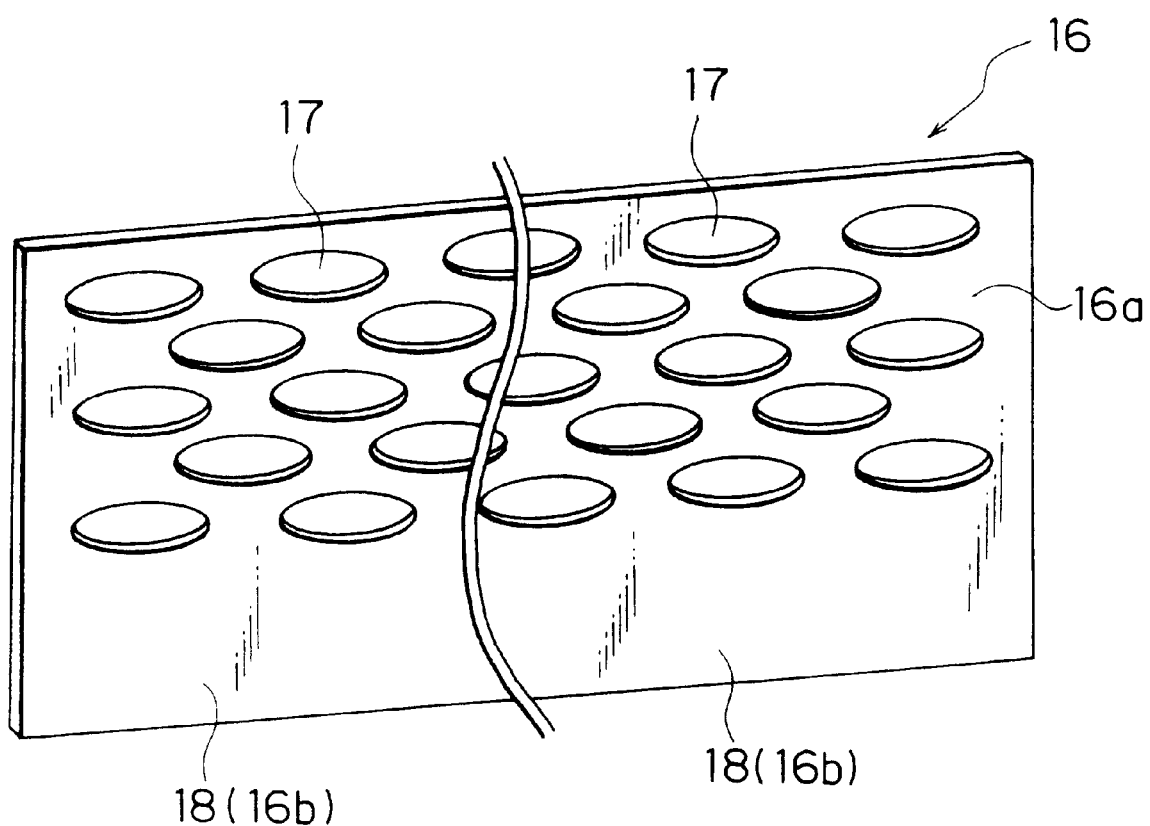
FIG. 6 is a perspective view of a movable plate shown in FIG. 5.

FIGS. 5 and 6 show a second embodiment of the invention which is adapted to prevent bridging and to improve the supply of the flour 2 to the passageway 19, over the first embodiment.

With reference now to FIGS. 5 and 6, wherein the same reference numbers designate elements similar to those previously described with reference to FIGS. 1 through 4, a movable plate 16 is shown which has a desired thickness and is mounted above the entrance of the passageway. The plate 16 is arranged to bear on the inner wall 3a of the hopper 3, and is slidably supported by a driving mechanism (not shown) fixed to the plate 16, so that the plate 16 can slide along the inner wall 3a in an upward/downward direction.

As shown in FIG. 6, an upper portion 16a of the plate 16 is preferably provided with a plurality of holes. It is understood that the upper portion 16a can be perforated, or can have cutouts. In this embodiment, the upper portion 16a is provided with elliptic apertures 17, which are arranged in an alternating pattern whereby the flour 2 in the hopper 3 is adapted to flow into the apertures 17. Each aperture 17 is spaced apart from the adjacent apertures 17 by desired distances. A lower portion 16b of the plate 16 is preferably a solid body. This lower portion is not provided with openings, so that it forms flat surfaces 18.

When the plate 16 is energized by the driving mechanism, the plate slides along the inner wall 3a of the hopper 3 so as to move toward and away from the entrance of the passageway 19 and this movement stirs the flour 2 within the hopper, and the flour is further stirred by the holes in the upper portion 16a of the movable plate 16, thereby decreasing the possibility of bridging. During this movement, the flour is forced to be fed into the entrance of the passageway 19 by a flat surface 18 on the lower portion 16b of the plate 16, thereby establishing a suitable feed of the flour 2 from within the hopper 3 to the opening 10.

The configuration of the movable plate 16 is not limited to the above-mentioned one, but may be changed to other suitable configurations. For example, it is also possible to design a movable plate which has holes formed substantially over the entire length of the plate in order to minimize the possibility of bridging. This movable plate is located so that its sliding motion does not interfere with guiding the flour 2 by the rotation of the drum 4.

Alternatively, in some cases, depending on the characteristics of the powder material, it is also possible to use a plate in which no apertures 17 are provided, so as to form the flat surfaces 18 substantially over the entire length of the plate. Such a plate may, depending on the characteristics of the powder material, be able to establish a satisfactory operation to prevent bridging and satisfactorily feed the powder material by a sliding motion of the plate 16.

As another alternative, the upper portion 16a of the movable plate 16 can have a rough surface, that is, e.g., it can have protrusions and recesses that mechanically enable flour to cling to the rotation surface 4b of the drum 4. It can also be replaced by a material having a high coefficient of friction.

From the above description, it is apparent that the invention disclosed herein provides an advantageous sprinkling method and apparatus for sprinkling powder material onto food material. The foregoing discussion merely discloses and describes exemplary embodiments of the present invention. As will be understood by those familiar with the art, the invention may be embodied in other specific forms without departing from the spirit of this invention or essential characteristics thereof. For example, the food product is not limited to only bread dough sheets, but may be other products such as dough pieces of specific forms, and cakes. Furthermore, the powder material is not limited only to flour, but may be other material, including wheat protein powder, spice powder, and other powder of food additives. Still further, the movable plate can be suitably designed for the kind of powder material to be used. Accordingly, the above disclosure of the present invention is intended to be illustrative of, but not limiting, the scope of the invention, which is set forth in the following claims.

What is claimed is:

1. An apparatus for sprinkling powder material onto food products, the food products being placed on an upper surface of a conveyor, the apparatus comprising:

hopper means, located above said conveyor, for holding powder material in a space defined by inner walls of said hopper means, said inner walls including a first substantially vertical wall, a second vertical wall opposite said first vertical wall, and curved portions located under said vertical walls, said hopper means having an exit opening provided on a bottom thereof;

a rotating member, rotatably mounted within said hopper means, said rotating member having a rotation surface wherein recesses are provided thereon for receiving the powder material and wherein said rotation surface rotates in a direction toward an area under said first vertical wall of said inner walls as viewed from said first vertical wall;

a narrow passageway provided between said rotation surface of said rotating member and said inner walls of said hopper means for receiving the powder material, said narrow passageway having a width that is narrower at the area near said exit opening than at the area above said curved portion of said inner walls of said hopper means, so that said narrow passageway presses the powder material against said rotation surface of said rotating member in said hopper means;

a movable plate slidably supported on said inner wall of said hopper means above said narrow passageway, wherein said movable plate stirs the powder material within said hopper means and feeds the powder material into said narrow passageway by its sliding movement; and means for wiping the compressed powder material from said rotation surface of said rotating member adjacent said exit opening of said hopper means, thereby causing the wiped powder material to exit through said exit opening.

2. An apparatus as recited in claim 1 wherein said wiping means comprises a wire mesh.

3. An apparatus as recited in claim 1 wherein said wiping means comprises a woven material.

4. An apparatus as recited in claim 1 wherein said movable plate has a flat surface for feeding the powder material into said narrow passageway.

5. An apparatus as recited in claim 1 wherein said movable plate has a plurality of through holes opening on the inner surface of the hopper.

6. An apparatus as recited in claim 1 wherein said movable plate has a rough surface for stirring the powder material, so as to break up bridges formed by the powder material.

7. An apparatus as recited in claim 1 wherein said movable plate is composed of a material having a high coefficient of friction.

* * * * *